Sept. 15, 1925.  
E. J. SIBLEY  
1,554,041
FRICTION CASEMENT ADJUSTER
Filed Nov. 27, 1922  2 Sheets-Sheet 1
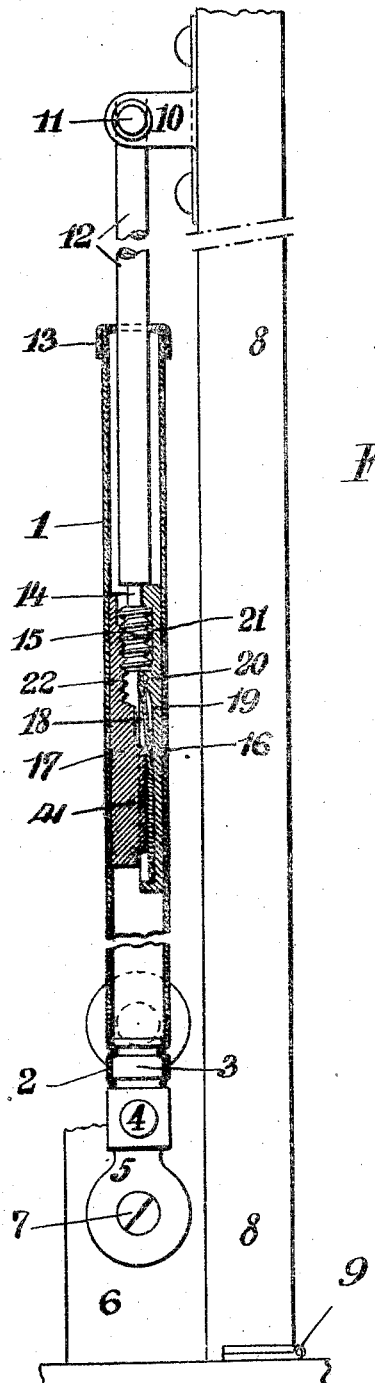
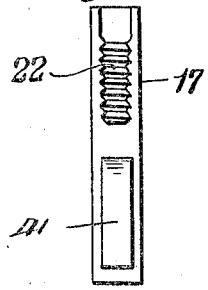
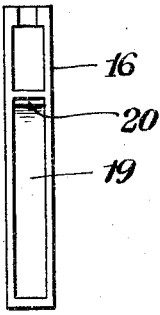
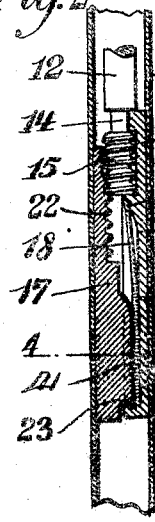
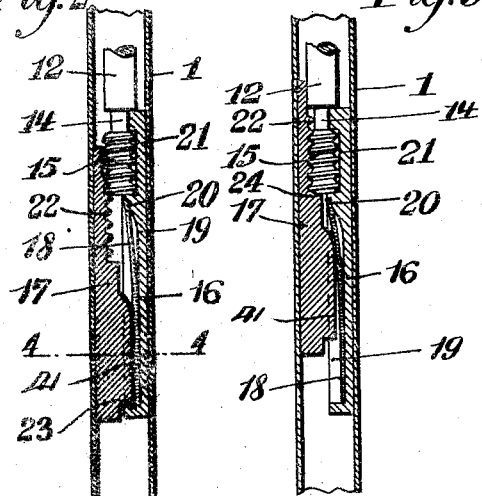
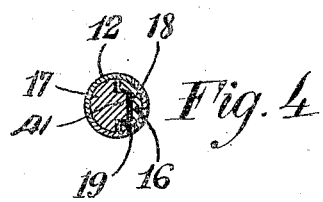
Edwin J. Sibley, Inventor
By his Attorney Sept. 15, 1925.  
E. J. SIBLEY  
1,554,041  
FRICTION CASEMENT ADJUSTER  
Filed Nov. 27, 1922  2 Sheets-Sheet 2

Edwin J. Sibley, Inventor
By his Attorney

Patented Sept. 15, 1925.

1,554,041

UNITED STATES PATENT OFFICE.

EDWIN J. SIBLEY, OF WOODHAVEN, NEW YORK.

FRICTION CASEMENT ADJUSTER.

Application filed November 27, 1922. Serial No. 603,392.

*To all whom it may concern:*

Be it known that I, EDWIN J. SIBLEY, a citizen of Canada, and resident of Woodhaven, in the county of Queens and State of New York, have invented certain new and useful Improvements in Friction Casement Adjusters, of which the following is a specification.

The object of this invention is to improve generally the construction of friction casement adjusters of the type disclosed in my U. S. Patent No. 1,412,199 dated April 11, 1922, without, however, limiting the application of the present invention to that or any other specific type of adjuster.

One object of the invention is to reduce the cost of manufacture by eliminating certain parts, and substituting less expensive parts for some of those used.

Another object of the invention is to embody certain novel and improved features in friction casement adjusters, such, for instance, as providing means preventing unskilled or irresponsible persons from operating the friction means to an extent where absolute freedom from frictional engagement is obtained, and also preventing them from going too far in the opposite direction and so operate the friction means so as to jam or lock them, and thereby prevent the adjuster from functioning in the proper manner.

Other novel features herein disclosed include means for preventing disengagement of the operating plunger from the friction shoes after the adjuster has been assembled, and means permitting adjustment of the friction without changing the length of the adjuster thereby preventing jamming or torsional strains on the sash when the window or other device controlled by the adjuster, is closed.

Other novel features and objects of the invention will be pointed out as this specification proceeds while reference is had to the accompanying drawings in which—

Figure 1 is a longitudinal sectional view of an adjuster embodying my invention with parts broken away.

Figure 2 is a detail view of the friction means shown adjusted to minimum friction pressure.

Figure 3 is a similar view showing the friction means adjusted to maximum friction pressure.

Figure 4 is a transverse sectional view on line 4—4 of Figure 3.

Figures 5 and 6 are detail views of the friction shoes.

Figure 7:
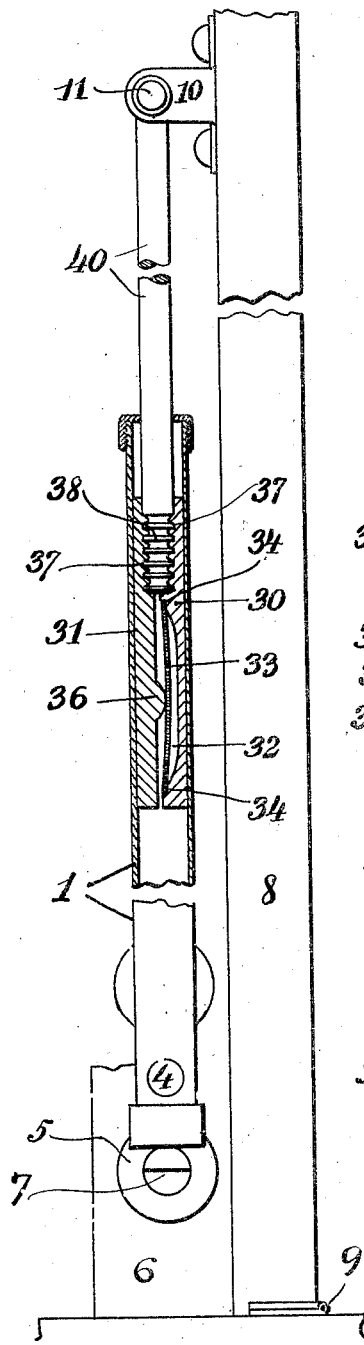
Figure 7 illustrates the principle of the invention as applied to a different type of adjuster.

The friction casement adjuster comprises a tube or barrel 1 which is rotatably mounted as at 2 on a short arm 3 which latter in turn is pivoted at 4 to a suitable bracket 5. The numeral 6 denotes the window sill, frame or other fixed member to which the bracket 5 is secured by screws 7.

The numeral 8 denotes the window sash or frame, or other movable member the free swing of which it is desired to control. It is pivoted at 9 to the fixed member 6. To the movable member 8 there is secured a bracket 10 to which is pivoted at 11 a plunger 12. The plunger 12 extends within the tube 1 through a cap 13 which serves as a guide for the plunger and finishes off the end of the tube.

The tube 1 and plunger 12 are operatively engaged by a suitable clutch or friction device providing friction between the two members, and means are also provided for adjusting and regulating the friction.

Within the tube 1 the plunger 12 is provided with a reduced neck portion or annular recess 14 and the end of the plunger beyond the recess is screw threaded as at 15. The screw 15 operates in and between the two clutch members or semi-circular friction shoes 16 and 17, and the friction is supplied by a flat spring 18 held between the shoes. The shoe 16 may be termed the spring supporting shoe because it is formed with a recess 19 containing the spring and is provided with a shoulder 20 on which the one end of the spring rests, while the other end of the springs rests in the recess 19.

The shoe 16 is further provided with a non-threaded recess 21 for receiving the screw 15 of the plunger 12 and whereby relative longitudinal movement between the plunger 12 and the shoe 16 is rendered impossible.

The other friction shoe 17 may be called the friction adjusting member because it is provided with a lug 41 adapted to bear against and operate the spring so as to adjust the spring pressure between the friction shoes. The shoe 17 is operated longitudinally of the plunger by means of the screw thread 22 on the shoe which engages the screw 15. The said longitudinal movement of the shoe 17 is limited in one direction by the lug 41 abutting the end of the recess 19 as shown at 23 in Figure 2, and in the opposite direction by the bottom of the screw thread 22 abutting the end of the screw 15 as shown at 24 in Figure 3.

The friction of the device is adjustable between the limits of minimum and maximum flexing of the spring 18 as effected by the position of the lug 41 on the shoe 17.

The cooperating flat surfaces of the shoes and the spring prevent relative rotative movement therebetween.

In assembling, the spring 18 is placed in the recess 19 between the shoes, and the end of the plunger 12 also placed between the shoes in the smooth recess 21 and the screw 15 in engagement with the thread 22. The cap 13 has of course first been placed on the plunger. The plunger, with the friction shoes, which are preferably made of Babbitt metal, is then pushed into the tube and the cap 13 screwed upon the latter. The adjuster is then placed in position for use.

When it is desired to adjust the friction, the operator takes hold of the tube 1 with one hand and rotates it thereby causing a lateral movement of the shoe 17 within the tube due to the engagement of the shoe thread 22 with the screw 15 on the plunger which cannot turn.

Thus the adjusting shoe 17 will be screwed on or off the screw 15 like a nut, and the lug 41 will be moved longitudinally towards the plunger to increase the friction as in Figure 3, or the lug 41 will be moved longitudinally away from the plunger to decrease the friction as in Figure 2.

The friction, or flexing of the spring, may be done between the two extreme limits of movement of the shoe 17 as shown in Figures 2 and 3. Hence absolute freedom from friction or excessive friction which might jam the parts, either of which condition might damage the adjuster or the device controlled thereby is impossible. Another feature is that the plunger cannot be separated from the friction shoes without taking the adjuster apart.

The invention presents still another advantage in that the distance at any particular moment between the pivot points 7 and 11, that is the length of the adjuster when used, is not changed by adjusting the friction, because, as we have seen, only the shoe 17 moves longitudinally of the adjuster when adjustment is made. This includes another advantageous feature in that there is never any danger of jamming the friction device against the short arm 3.

A further advantage resides in the fact that commercial flat steel spring material may be used for the spring 18 requiring no special shaping or other work. This decreases the cost of manufacture, as does also the small number of parts required.

The principle of employing two friction shoes one of which is laterally movable with respect to the other in order to adjust the friction may also be used in an adjuster of the type shown in Figure 7, which type is ordinarily called non-adjustable because it cannot be adjusted after being placed in position.

As seen in Figure 7 the friction shoes 30 and 31 are constructed very much like the shoes 16 and 17 in Figure 1, that is the shoe 30 has a recess 32 for receiving the spring 33 which rests on two shoulders 34, 34 is the recess. The shoe 31 is provided with a flexing lug 36 similar to the lug 41 aforesaid. Both shoes have a plurality of annular grooves 37 adapted to receive the annular shoulders or rings 38 on the end of the plunger 40.

Figures 8, 9:
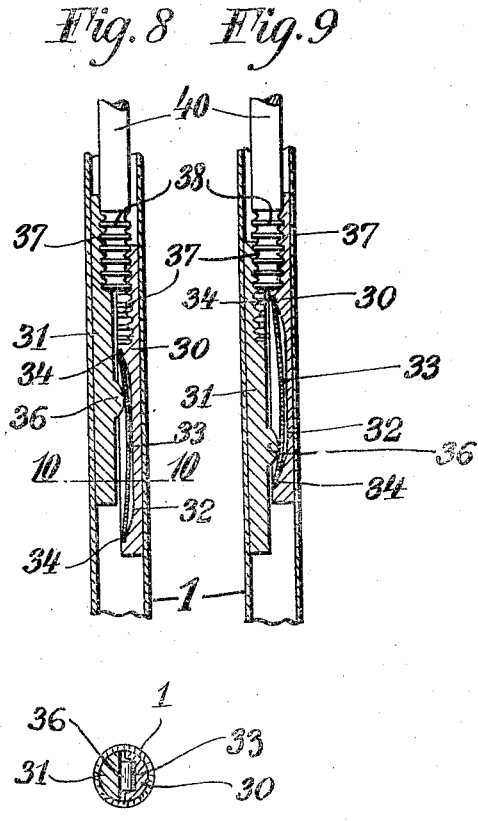
Figure 8 shows the friction means in Figure 7 adjusted in one position.
Figure 9 shows the same friction means adjusted in the opposite position.
Figure 10:
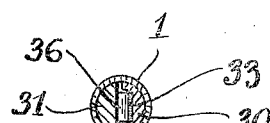
Figure 10 is a transverse sectional view on line 10—10 of Figure 8.

In this case the adjustment of the friction is effected by placing the parts in the position shown in Figure 7 where the friction is a minimum pressure, or in any other position in opposite directions as shown in Figures 8 and 9 for maximum pressure when the spring is flexed most strongly.

Such adjustment is done before assembling the adjuster. Also in this case it is impossible to disconnect the plunger from the friction shoes without dismounting the parts.

In neither case is the flat nature of the spring changed by adjusting it and in neither case is the effective length of the adjuster changed by adjustment of the friction.

I claim:—

1. The combination of a tube, a plunger adapted to slide therein, friction means interposed between said tube and plunger, means for placing said tube and plunger in longitudinally relatively fixed predetermined positions and means for adjusting said friction means to a predetermined minimum degree of friction by rotation of the said tube, while the latter and the plunger remain positioned as aforesaid.

2. The combination of a tube, a plunger adapted to slide therein, friction means interposed between said plunger and the tube and comprising a pair of diametrically opposed semicircular friction shoes, a friction element between said shoes, means connecting one of said shoes in longitudinal fixed relation to the said plunger and means on the latter for operating the other of said shoes to adjust the said friction element upon rotation of the said tube.

3. The combination of a tube, a plunger adapted to slide therein, a friction shoe within said tube in fixed operative relationship with the said plunger, said friction shoe being located to one side of said plunger between the latter and the tube, another friction shoe within said tube located diametrically opposite the said first named shoe, a friction element supported between the said two friction shoes, and means on said other friction shoe operable upon rotation of the said tube for actuating said other friction shoe to adjust the said friction element.

4. The combination of a tube, a plunger adapted to slide therein, friction means interposed between said plunger and tube within the latter and comprising a pair of friction shoes located on opposite sides of said plunger, means for supporting one of said friction shoes on the said plunger in fixed axial relation thereto and means for operating the other of said shoes axially with respect to said plunger to adjust the friction between the latter and the tube.

5. The combination of a tube, a plunger adapted to slide therein, friction means interposed between said plunger and tube within the latter and comprising a pair of diametrically opposed semi circular friction shoes, means for supporting one of said friction shoes on the said plunger in fixed axial relation thereto and means for operating the other of said shoes axially with respect to said plunger to adjust the friction between the latter and the tube, said operating means being actuated by rotation of the said tube.

6. The combination of a tube, a plunger adapted to slide therein, friction means interposed between said plunger and tube within the latter and comprising a pair of friction shoes, a recess formed in one of said shoes for receiving a portion of said plunger whereby to support the said one shoe in fixed axial relation with said plunger, inter-engaging screw threads on said plunger and the said other shoe for operating the latter longitudinally of the said first shoe and a spring in said recess adapted to be adjusted by the said other movable shoe.

7. The combination of a tube, a plunger adapted to slide therein, friction means interposed between said plunger and tube within the latter and comprising a pair of friction shoes, a friction spring between said shoes, a recess in one of said shoes for receiving the said spring and a lug on the other shoe extending into the said recess to operate the said spring.

8. The combination of a tube, a plunger adapted to slide therein, friction means interposed between said tube and plunger, means for adjusting said friction means and means preventing adjustment thereof beyond a predetermined minimum degree of friction.

EDWIN J. SIBLEY.